US012363200B2

(12) United States Patent
Goh et al.

(10) Patent No.: US 12,363,200 B2
(45) Date of Patent: Jul. 15, 2025

(54) PROVIDING EVENT STREAMS AND ANALYTICS FOR ACTIVITY ON WEB SITES

(71) Applicant: Content Square SAS, Paris (FR)

(72) Inventors: Cynthia Goh, Paris (FR); Aharon Shemesh, Paris (FR); Gaia Dolev, Paris (FR); Joël Trigalo, Paris (FR); Bashar Abed, Paris (FR); Zook Kessler, Paris (FR); Victor Cojocaru, Paris (FR); Immanuel Ajzner, Paris (FR); Shahaf Amsalem, Paris (FR); Lionel Seguin, Paris (FR); Felix Lima Gorito, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/731,747

(22) Filed: Apr. 28, 2022

(65) Prior Publication Data

US 2023/0199083 A1 Jun. 22, 2023

Related U.S. Application Data

(60) Provisional application No. 63/292,709, filed on Dec. 22, 2021.

(51) Int. Cl.
*H04L 67/50* (2022.01)
*G06F 16/955* (2019.01)
*G06F 16/957* (2019.01)

(52) U.S. Cl.
CPC ........ *H04L 67/535* (2022.05); *G06F 16/9566* (2019.01); *G06F 16/957* (2019.01)

(58) Field of Classification Search
None
See application file for complete search history.

(56) References Cited

U.S. PATENT DOCUMENTS 9,747,191 B1 * 8/2017 Marolia .............. G06F 11/3466
2011/0320880 A1 12/2011 Wenig et al.
(Continued)

FOREIGN PATENT DOCUMENTS

WO 2023119202 6/2023

OTHER PUBLICATIONS

"International Application Serial No. PCT/IB2022/062642, International Search Report mailed Mar. 2, 2023", 4 pgs.
(Continued)

*Primary Examiner* — Kevin S Mai
(74) *Attorney, Agent, or Firm* — Schwegman Lundberg & Woessner, P.A.

(57) ABSTRACT

The subject technology detects user activity on a web site, the user activity corresponding to a user session on the web site associated with first client device of a visiting user. The subject technology selects a recording process for the user activity based at least in part on a set of recording parameters, the set of recording parameters being configured prior to detecting the user activity. The subject technology performs the recording process to generate an event stream based at least in part on the set of record parameters. The subject technology stores the event stream after the session has ended. The subject technology provides the event stream for viewing the user session on a second client device, the second client device being different from the first client device.

30 Claims, 14 Drawing Sheets

(56) References Cited

U.S. PATENT DOCUMENTS

| | | | |
|---|---|---|---|
| 2017/0019489 A1* | 1/2017 | Churchill | G06Q 30/0201 |
| 2019/0260818 A1* | 8/2019 | Ciabarra, Jr. | G06F 11/36 |
| 2020/0296177 A1* | 9/2020 | Hammer | G06Q 30/0202 |
| 2020/0396304 A1* | 12/2020 | Webber | G06F 11/3438 |
| 2021/0083954 A1 | 3/2021 | Kieviet et al. | |

OTHER PUBLICATIONS

"International Application Serial No. PCT/IB2022/062642, Written Opinion mailed Mar. 2, 2023", 9 pgs.

\* cited by examiner

PROVIDING EVENT STREAMS AND ANALYTICS FOR ACTIVITY ON WEB SITES

This application claims the benefit of priority of U.S. Provisional Patent Application No. 63/292,709, filed Dec. 22, 2021, which is hereby incorporated by reference herein in its entirety for all purposes

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

To increase user visitations and revenue, web sites have become very sophisticated. Web sites typically include web pages that provide information to users, advertise products or services to users and/or provide site search functions for users. A problem for web site owners is how to determine how successful the web site is, for example, whether the informational or other needs of users are met and whether the users are purchasing goods and services advertised on their site.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 7 illustrates an example user interface in accordance with one embodiment.

FIG. 9 illustrates an example user interface in accordance with one embodiment.

DETAILED DESCRIPTION

Embodiments of the subject technology described herein provide techniques for recording user activity (events, URLs accessed, and the like) on web sites to generate event streams that enable playback of such user activity corresponding to different user sessions on a given client device. By providing such playback of user sessions, different insights can be determined to facilitate improved debugging of problematic areas of such websites, identifying areas or URLs that could be targeted for improvements, among other types of insights. It is therefore appreciated that improving such URLs thereby improves the functionality of a computer (e.g., the subject system as described further herein) by at least enabling resolving errors that occur within web sites that the subject system performs recording of user activity thereon.

Networked Computing Environment

Figure 1:
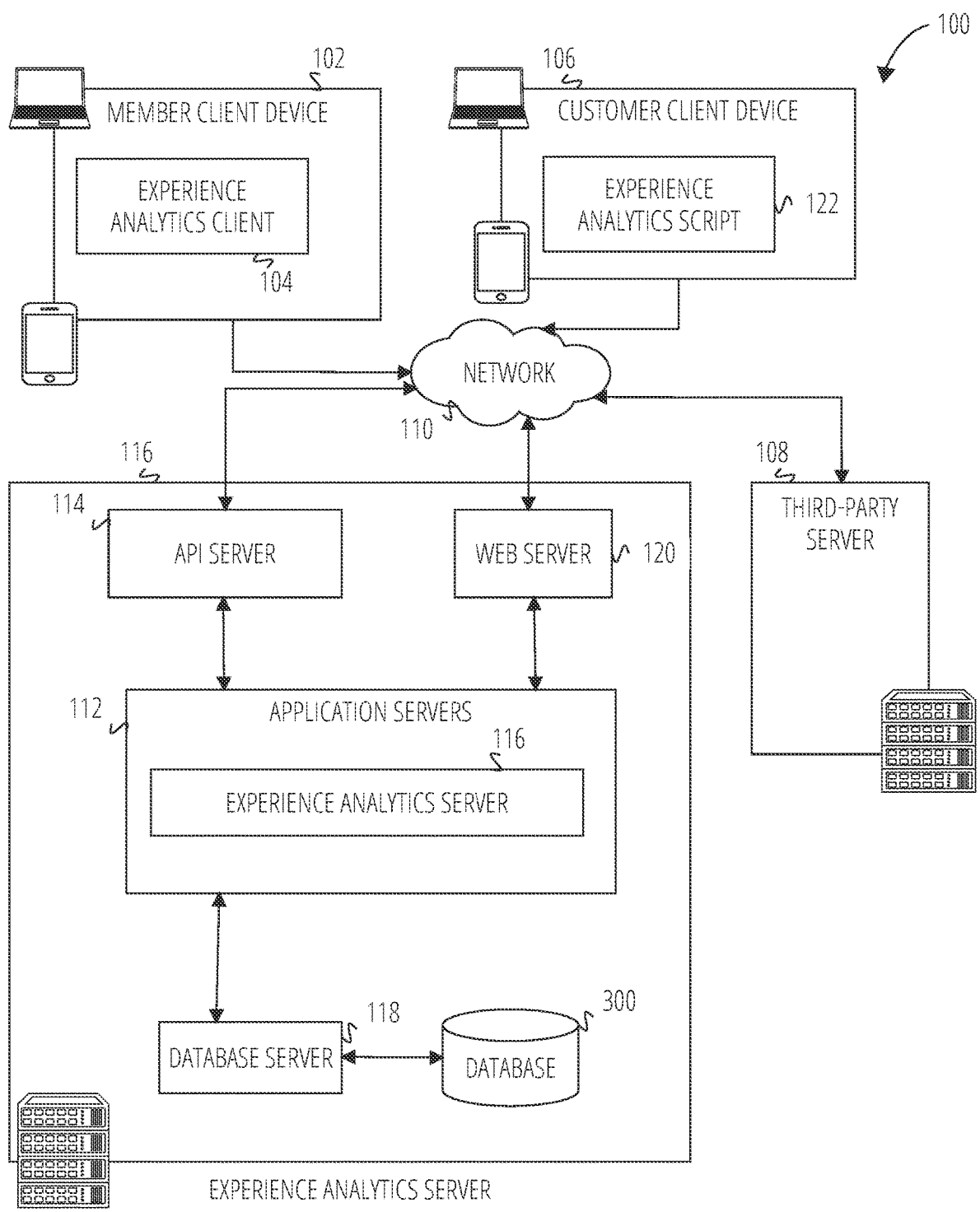
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100 that has a website hosted on by the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server 116 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server 116. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server 116 via the network 110. In another example, the experience analytics script 122 transmits the data to the third-party server 108 and the data can be transmitted from the third-party server 108 to the experience analytics server 116.

An experience analytics client 104 is able to communicate and exchange data with the experience analytics server 116 via the network 110. The data exchanged between the experience analytics client 104 and the experience analytics server 116, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server 116 supports various services and operations that are provided to the experience analytics client 104. Such operations include transmitting data to and receiving data from the experience analytics client 104. Data exchanges to and from the experience analytics server 116 are invoked and controlled through functions available via user interfaces (UIs) of the experience analytics client 104.

The experience analytics server 116 provides server-side functionality via the network 110 to a particular experience analytics client 104. While certain functions of the experience analytics system 100 are described herein as being performed by either an experience analytics client 104 or by the experience analytics server 116, the location of certain functionality either within the experience analytics client 104 or the experience analytics server 116 may be a design choice. For example, it may be technically preferable to initially deploy certain technology and functionality within the experience analytics server 116 but to later migrate this technology and functionality to the experience analytics client 104 where a member client device 102 has sufficient processing capacity.

Turning now specifically to the experience analytics server 116, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
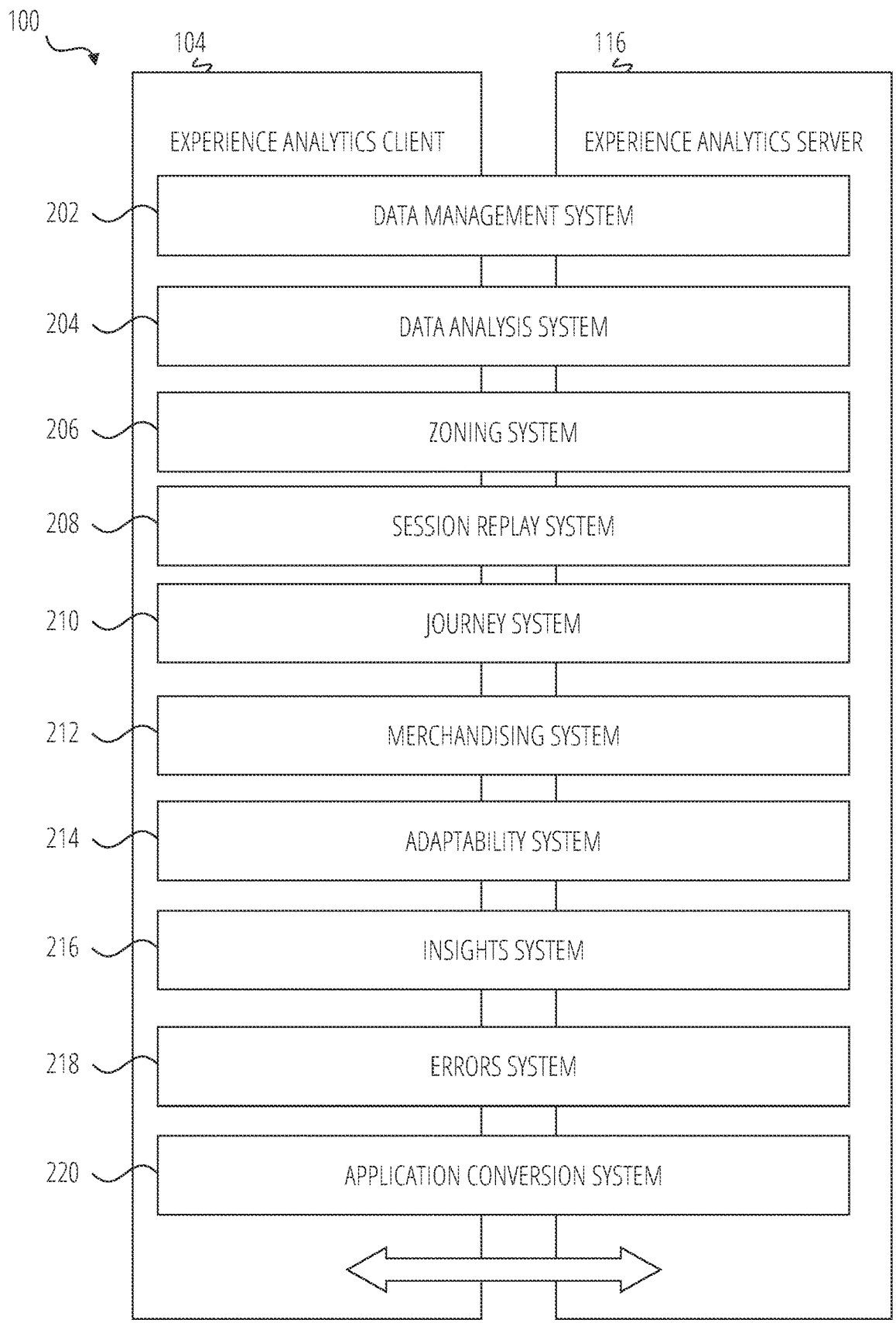
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

In an embodiment, the session replay system 208 includes a user interface element (e.g., a button, or some other selectable interface item) that enables switching between different type of player applications (e.g., session player, URL player). For example, the session replay system 208 provides a session player that provides playback of an entire user session for a particular user. In another example, the session replay system 208 provides a URL player that provides playback of different sessions of different users that each access a particular URL. The aforementioned user interface element can be selected during playback that enables switching between the different player applications discussed before. In an example, when the URL player has been selected, a playlist can be generated for playing different user sessions based on the URL. In particular, during the playback of a given user session by the session player, the session replay system 208 can determine which URL was currently being played as part of the user session when the user interface element was selected, and then generate the playlist for playback of different user session for that same URL upon switching to the URL player.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on a conversions (e.g., sales, revenue) associated with a placement or zone in the client website.

The adaptability system 214 is responsible for creating accessible digital experiences for the client's website to be displayed by the customer client devices 106 for users' that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can analyze the data from the experience analytics script 122 to determine whether an accessibility-enhanced version of the client's website is needed and generates the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on within a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that causes frustration to the users (e.g., users on customer client devices 106 visiting the client's website). The errors can also include causes of looping behaviors by the users, in-page issues such as unresponsive call to actions and slow loading pages, etc. The errors can be displayed by the member client devices 102 via the experience analytics client 104 on within a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, merchandising interface, insights interface, and errors interface to be displayed by the member client device 102 via the experience analytics client 104. The application conversion system 220 generates an accessibility-enhanced version of the client's mobile application to be displayed by the customer client devices 106.

Embodiments of the subject technology provide implementations for recording user activity for user sessions for a given client's website(s) as discussed herein.

In some embodiments, the subject system enables recording user activity corresponding to a user session on a given client's website that enables determining different analytics. In one example, this recording may be performed by the experience analytics script 122 and then information related to the recording provided to the data management system 202 for storage on a database (e.g., discussed further below in FIG. 3). In particular, user activity during the user session can be recorded as an event stream which is processed by the data management system 202 for storing in a session table (discussed below in FIG. 3), in which the event stream can provide a playback of the user session for viewing on the experience analytics client 104. In this regard, the session replay system 208 accesses the recorded user session (e.g., the event stream) from the session table for playback on the experience analytics client 104.

In embodiments, the experience analytics script 122 can be configured to provide different mechanisms (each employing a different approach) to record user activity, which is discussed below. In embodiments, the experience analytics script 122 can work in conjunction with the experience analytics server 116 to record user activity, and provide information (e.g., metadata and the like) related to the user activity to data management system 202 for storing, and where the data analysis system 204 can determine analytics from analyzing the recorded user activity.

The following discussion relates to different techniques can be utilized in connection with generating an event stream (e.g., recording a user session) by at least the experience analytics script 122 (or other components of experience analytics system 100 such as the session replay system 208). Such techniques can be understood as different recording parameters which determine which user activity to record or when to record such user activity (e.g., in response to an event or based on a particular identifier, and the like).

In an embodiment, a first technique utilizes random sampling in which a random number is generated for a user visiting a client's web site, and the user's session is randomly selected based on the random number (e.g., based on whether a first random number associated with the user's session is within a threshold of a second random number generated by the system, where the first random number and second random number are both guaranteed to be within a same range of numbers, e.g., 0 to 10 including decimal numbers within, or 0 to 1 including decimal numbers within, and the like). If the user's session is selected, the subject system can determine whether recording the session falls within a sampling rate corresponding to global replay sampling parameter (e.g., based on a number of sessions already recorded for a given period of time such as an hour, or a day, and the like), and if so, then the experience analytics script 122 performs operations to record the session for the user for storing into a session table (discussed further below in FIG. 3); otherwise, the session is not recorded and not stored into the session table. In an example, the sampling rate can be between 1% to 10% for a client that is a smaller organization, while in other instances the sampling rate can be 25% or above 25% for a client that is a larger organization.

In an embodiment, a second technique involves URL sampling for session recording. URL sampling includes defining URLs that specified for recording, and if URL is one of the specified, then record session based on a sampling rate (e.g., 50% of the time, 80% of the time, or 100% of the time). In an example, such a URL may be a checkout URL or a payment URL, and when one of these URLs is accessed by a visiting user during a session, a session recording can be initiated based on the sampling rate (e.g., based on a number of sessions already recorded for a given period of time such as an hour, or a day, and the like).

In an embodiment, a third technique involves defining event(s) that initiate recording. In an example, an event can occur at a session level: specific event e.g., a customer leaves feedback or a comment somewhere on the website, and as a result an entire user session is recorded upon detection of that event (e.g., the comment being received). In an example, user activity may be stored temporarily in a buffer or cache prior to detection of the event (e.g., the comment being received) to enable recording of the prior user activity before the event was detected. However, in another example, such user activity prior to detection of the event can be discarded (e.g., not recorded). In another example, an event can occur at a page level: specific to an event on a particular page, and recording is limited to the particular page after the event is detected on the page.

Some examples of events that are recorded during a user session can include user clicks, comments, JavaScript errors, API errors, page events, and the like. It is appreciated that any appropriate event can be specified for initiating a recording.

In an embodiment, recording is limited to a quota provided to a particular web site (e.g., quota based on how many page views per period of time such as annually as specified in a business contract and paid for by a given client).

In an embodiment, a quota management stop mechanism is provided by backend logic (e.g., experience analytics server 116) to determine a portion of a total amount of traffic on a web site in proportion to an amount of page views specified (and paid for) in a business contract with a given client.

In an embodiment, the subject technology preserves data freshness where a portion of replay of session is available within a specified time period (e.g., 10 minutes) instead of waiting for recording of the entire session to be completed before viewing.

In an embodiment, a public link can be generated for an event stream to enable access to the session replay. In an embodiment, the public link can be generated for an entire session replay or a portion of a session corresponding to a particular page view.

In an embodiment, the subject system provides a user identifier which enables the sending of personal identifiable information (PII) without revealing the personal identity of such a user. This user identifier is different than a default CS cookie identifier in an embodiment.

In an embodiment, the subject system enables defining information that is considered sensitive for targeted encryption of such information (e.g., using public key encryption and private key decryption).

In an embodiment, during replay of a user session, a timestamp indicating a local time of when the user was performing the user activity can be provided for display (e.g., when viewing playback from the experience analytics client 104).

In an embodiment, information related to touch events that occurred during a session are captured, and such information is indicated (or displayed) during replay of a user session. Touch events include touch inputs and gestures such as pinch, double-tap, zoom, spread, and the like.

In an embodiment, keystrokes can also be recorded to provide additional insights on user activity during a session. For example, keystroke information can be provided that is related to when a user fills in a first text input field and then navigates to fill in a second (text) input field, and the like.

In an embodiment, custom variables or dynamic variables can be defined in order to provide more context for a user session, in which an indication of such variables may be provided during playback of a user session. For example, a custom variable can be defined to indicate a type of web page that a user is visiting (e.g., landing page, checkout, and the like). For example, a dynamic variable can be defined to indicate a third party platform associated with a given user (e.g., Adobe analytics ID).

In an embodiment, user gestures (e.g., mouse clicks or touch gestures) on a given web page can be recorded and then indicated during replay of a user session. For example, by recording such user gestures, the experience analytics system 100 (or components thereof) can determine which portion(s) of a web page are considered "hot spots" indicating that such portion(s) are more likely to be recipients of such user clicks. In an example, the user gestures can be represented using some type of visual indicator (e.g., red dots) during playback of the session.

In an embodiment, the session replay system 208 provides various ways for URL filtering. In some instances, a user of the experience analytics client 104 may want to filter session replays to a particular URL (or relevant portion of a client's web site). For example, a filtering expression or string can be utilized that filters URLS that contains a particular string, or starts with a particular string, or ends with a particular string, and the like. In another example, filtering may involve a property of a URL such as when a web page was created (e.g., how new or recent a page is) or a page condition.

Data Architecture

Figure 3:
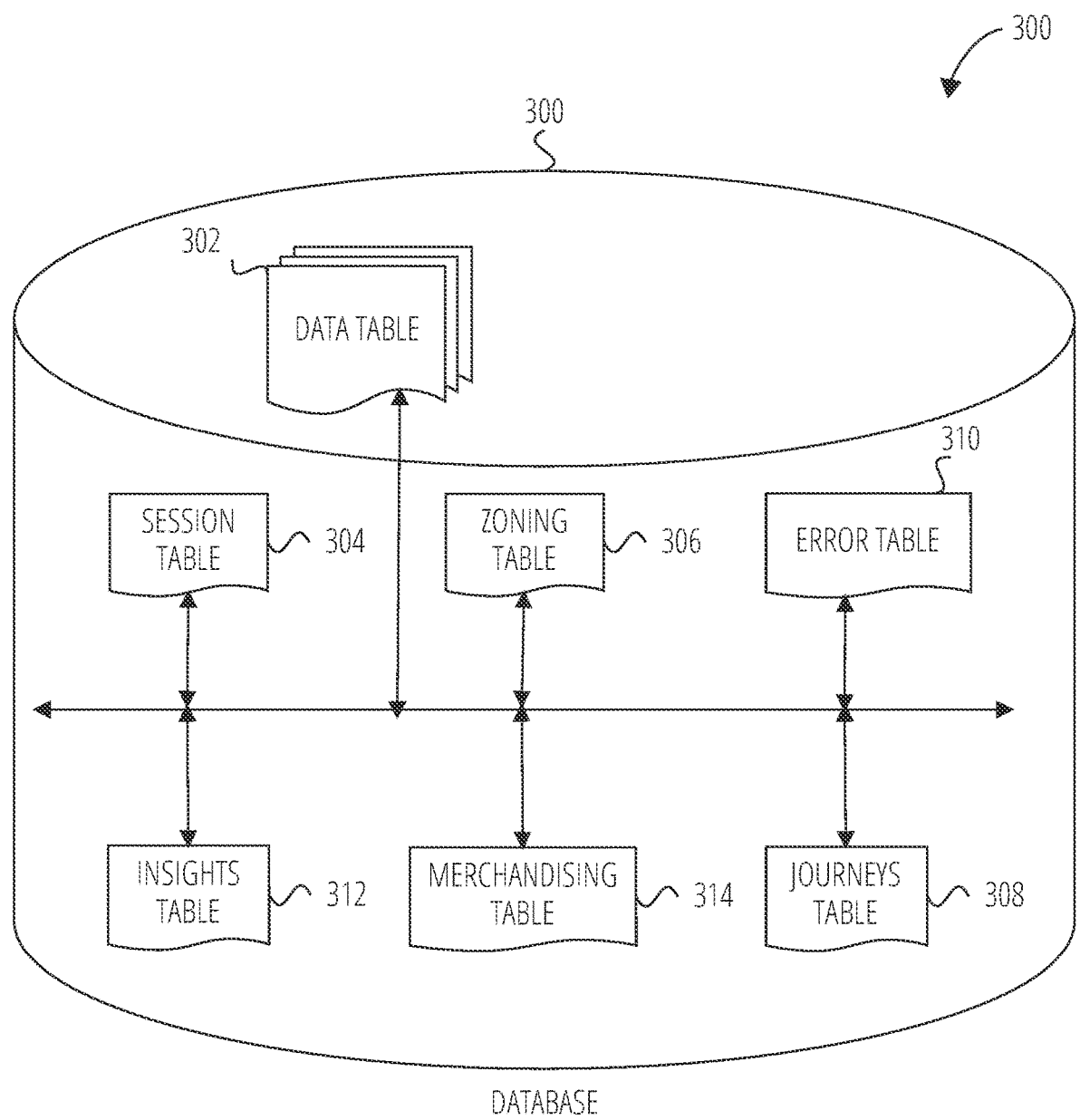
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays (e.g., event streams) for each of the client's websites and native applications. Such session replays correspond to event streams for users that visit one or more pages from client's websites, which can be accessed from the session table 304 and then viewed on the experience analytics client 104. In embodiments, for each session replay (e.g., event stream), the session table 304 includes data related to a set of URLs that are accessed and events that occur during a given session, along with time related information to correlate when each URL was accessed and each event had occurred relative to each other in an overall time period corresponding to the session. It is appreciated that the session table 304 can include any appropriate data described above related to generating event streams (e.g., recordings of user sessions) as discussed above.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Processes

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
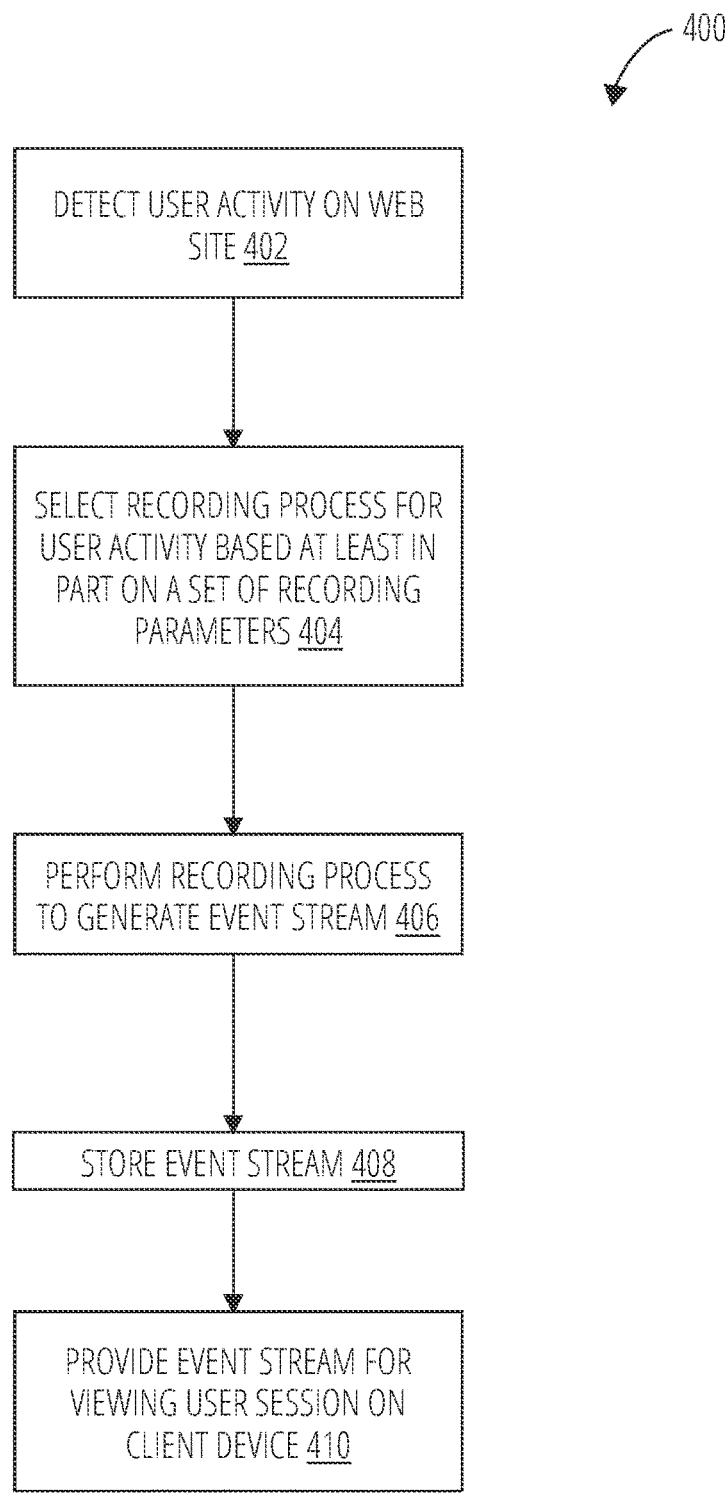
FIG. 4 is a flowchart for a process, in accordance with some examples.

FIG. 4 is a schematic diagram illustrating a process 400, in accordance with embodiments of the subject technology.

In block 402, the experience analytics script 122 detects user activity on web site. In an example, detection can be based on one or more user inputs including text entry, or click events, and the like.

In block 404, the experience analytics script 122 selects recording process for user activity based at least in part on a set of recording parameters. As mentioned above, the experience analytics script 122 can utilize one or more techniques described at least in connection with FIG. 2.

For example, the set of recording parameters can be a sampling rate. In this example, the experience analytics script 122 can generate a first random number based on a random number generator algorithm, select the user session for the recording process based on determining that the first random number is within a threshold of a second random number, where the second random number being generated after the first random number or after detecting the user activity on the web site, and initiate the recording process for the user session based at least in part on determining that recording the user session is within the sampling rate based on a number of previously recorded sessions within a period of time or number of stored event streams within the period of time.

In another example, the set of recording parameters can be a sampling rate based on a set of uniform resource locator (URLs). In this example, the experience analytics script 122 can determine, based on the user activity on the web site, that a particular URL from the set of URLs has been accessed, and initiate the recording process for the user session based at least in part on determining that recording the user session is within the sampling rate based on a number of previously recorded sessions within a period of time or number of stored event streams within the period of time.

In yet another example, the set of recording parameters can be a set of events. In this example, the experience analytics script 122 initiates the recording process for the user session in response to determining that a particular event was detected during the user session.

Additionally, in a further example, the set of recording parameters can be a set of events that occur on a set of uniform resource locator (URLs). In this example, the experience analytics script 122 initiates the recording process for the user session in response to determining that a particular event from the set of events was detected on a particular URL from the set of URLs during the user session.

In block 406, the experience analytics script 122 performs a recording process to generate an event stream. In an example, the experience analytics script 122 executes operations that capture user activity or events that occur during the user session, generating information (e.g., metadata and the like) for such user activity or events, and sends information to the experience analytics server 116 for processing and storing in the database 300.

In block 408, the experience analytics server 116 stores the event stream (e.g., in session table 304 in database 300).

In block 410, session replay system 208 provides the event stream for viewing a user session on a client device (e.g., experience analytics client 104).

Figure 5:
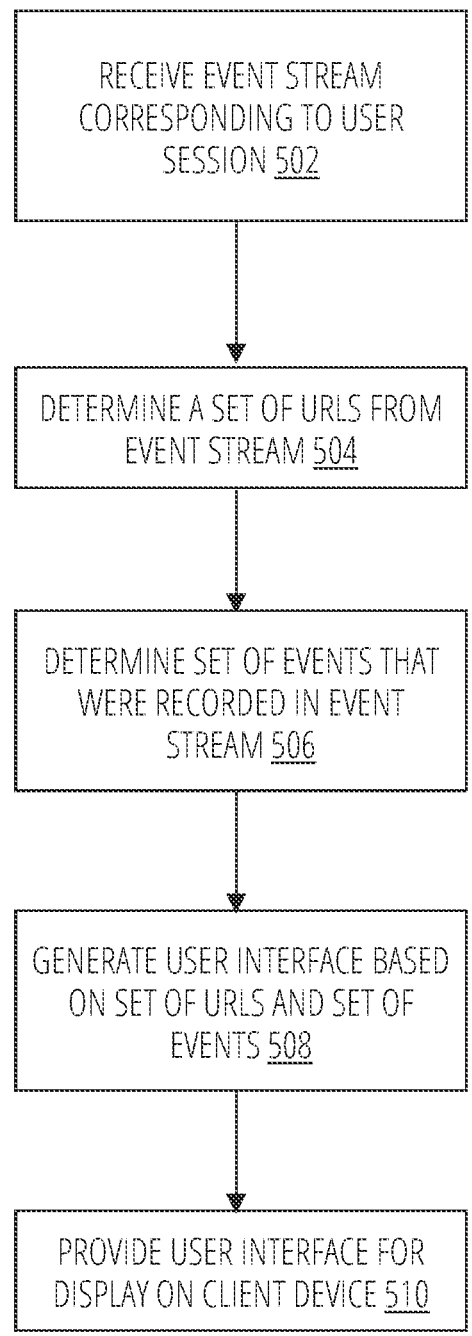
FIG. 5 is a flowchart for a process, in accordance with some examples.

FIG. 5 is a schematic diagram illustrating a process 500, in accordance with embodiments of the subject technology.

In block 502, session replay system 208 receives an event stream corresponding to a user session. In an example, the session replay system 208 performs a read operation on session table 304 in the database 300 for the event stream. In example, the session replay system 208 uses a particular identifier(s) (e.g., user identifier, session identifier, unique identifier, and the like) for locating the particular event stream stored in the database 300.

In this regard, in an example, the session replay system 208 searches a session table for the event stream corresponding to the user session based on a set of search parameters, where the set of search parameters includes a set of conditions, where the set of conditions includes an event type, an event identifier, an error type, a number of users, an error identifier, a user identifier, a URL identifier, or a session identifier, and the like. The session replay system 208 then retrieves the event stream from the session table based on matching the event stream to the set of search parameters.

In block 504, session replay system 208 determines a set of URLS from the event stream.

In block 506, session replay system 208 determines set of events that were recorded in event stream. In an example, the set of events includes at least one of a user click, a comment, a JavaScript error, an API error, or a page event.

In block 508, session replay system 208 generates user interface based on set of URLs and set of events. Alternatively, the set of URLs and set of events can be provided to the experience analytics client 104 which in turn generates a user interface for display based on such information.

In block 510, session replay system 208 provides a user interface for display on a client device (e.g., experience analytics client 104). As mentioned above, in an embodiment that the experience analytics client 104 generates the user interface, block 510 is performed instead by the experience analytics client 104. Examples of such user interfaces are discussed in more detail in FIG. 6 to FIG. 12 further below.

In an example, session replay system 208 generates the user interface based on the set of URLs and the set of events by performing the following: determining that a fixed mode for playback of the event stream has been activated for the user interface, providing for display a first interface area, the first interface area including a viewport for playback of the event stream, the first interface area displaying a set of frames from the event stream, each frame from the set of frames including a representation of a first set of graphical items from a particular URL of the web site, providing for display a second interface area adjacent to the first interface area, the second interface area comprising a second set of selectable graphical items corresponding to the set of URLs from the event stream, providing for display a third interface area adjacent to the first interface area and not adjacent to the second interface area, the third interface area comprising a third set of selectable graphical items corresponding to the set of events that were recorded in the event stream, wherein the first interface area includes a representation of a particular event from the third interface area that occurred within one URL from the set of URLs from the second interface area, and providing for display a fourth interface area, the fourth interface area comprising a fourth set of graphical items including a first graphical item corresponding to a timeline, a second graphical item corresponding to a representation of the particular event from the third interface area, and a third graphical item corresponding to a representation of the user activity that occurred within the one URL from the set of URLs from the second interface area.

In another example, session replay system 208 generates the user interface based on the set of URLs and the set of events by performing the following: determining that a floating mode for playback of the event stream has been activated for the user interface, providing for display a first interface area, the first interface area including a viewport for playback of the event stream, the first interface area displaying a set of frames from the event stream, each frame from the set of frames including a representation of a first set of graphical items from a particular URL of the web site, providing for display a second graphical item as an overlay over at least a portion of the first interface area, the second graphical item corresponding to a particular event associated with the event stream, providing for display a third interface area adjacent to the first interface area, the third interface area including a set of particular graphical items corresponding to a set of URLs that match a set of conditions, the set of URLs including at least one URL associated with a different user session than the user session, and providing for display a fourth interface area, the fourth interface area comprising a fourth set of graphical items including a first graphical item corresponding to a timeline, a second graphical item corresponding to a representation of the particular event from the second graphical item, and a third graphical item corresponding to a representation of the user activity that occurred within the one URL from the set of URLs from the event stream.

Figure 6:
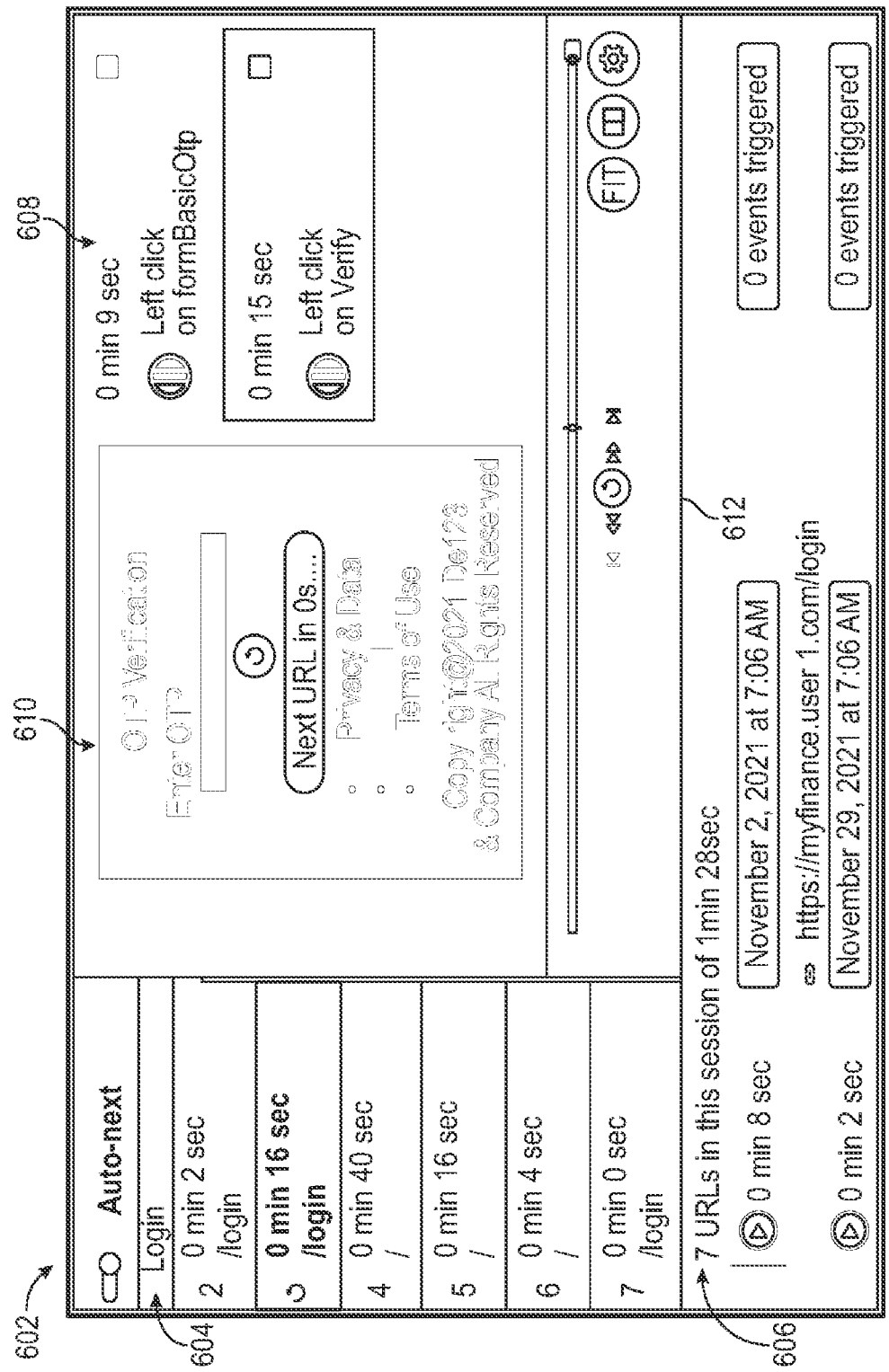
FIG. 6 illustrates an example user interface in accordance with one embodiment.

FIG. 6 is an example user interface 602 that facilitates playback of a user session (e.g., event stream) which is provided (e.g., by session replay system 208) for display on a client device (e.g., experience analytics client 104), in accordance with some embodiments of the subject technology.

As illustrated, user interface 602 includes various graphical elements corresponding to a session player. In an example, user interface 602 includes various interface areas including interface area 604, interface area 606, interface area 608, interface area 610, and interface area 612.

As mentioned before, the session replay system 208 can receive an event stream stored as a recorded user session from the database 300, determine a set of URLs and events from the event stream and send this information (among other types of information) to the experience analytics client 104 to inclusion on user interface 602. The experience analytics client 104 in an embodiment renders for display the user interface 602 with the aforementioned information into the different interface areas as mentioned above.

The following discussion relates to contents of each of the aforementioned interface areas in the example of FIG. 6.

As shown, interface area 604 includes a set of URLs from the event stream which can be presented in chronological order (or any other type of order) as each URL was accessed or viewed by the user during the session replay. As also shown, interface area 606 includes a set of URLs that are accessed or viewed by the user during the session replay. Moreover, interface area 608 includes a set of events corresponding to events such as user activity including user clicks, comments, JavaScript errors, API errors, user clicks, and page events, and the like. Each event can be displayed as a selectable graphical item, which upon being selected, is provided for display in interface area 610. As also shown, interface area 612 includes a selectable representation of a timeline corresponding to the session playback which can include graphical indicators of the events shown in interface area 608. Additionally, interface area 612 also includes a set of playback controls (e.g., play, pause, fast forward, fast reverse, skip forward, skip backward, and the like). It is understood that user interface 602 can include fewer or additional interface areas or graphical items and still be within the scope of the subject technology.

Figure 7:
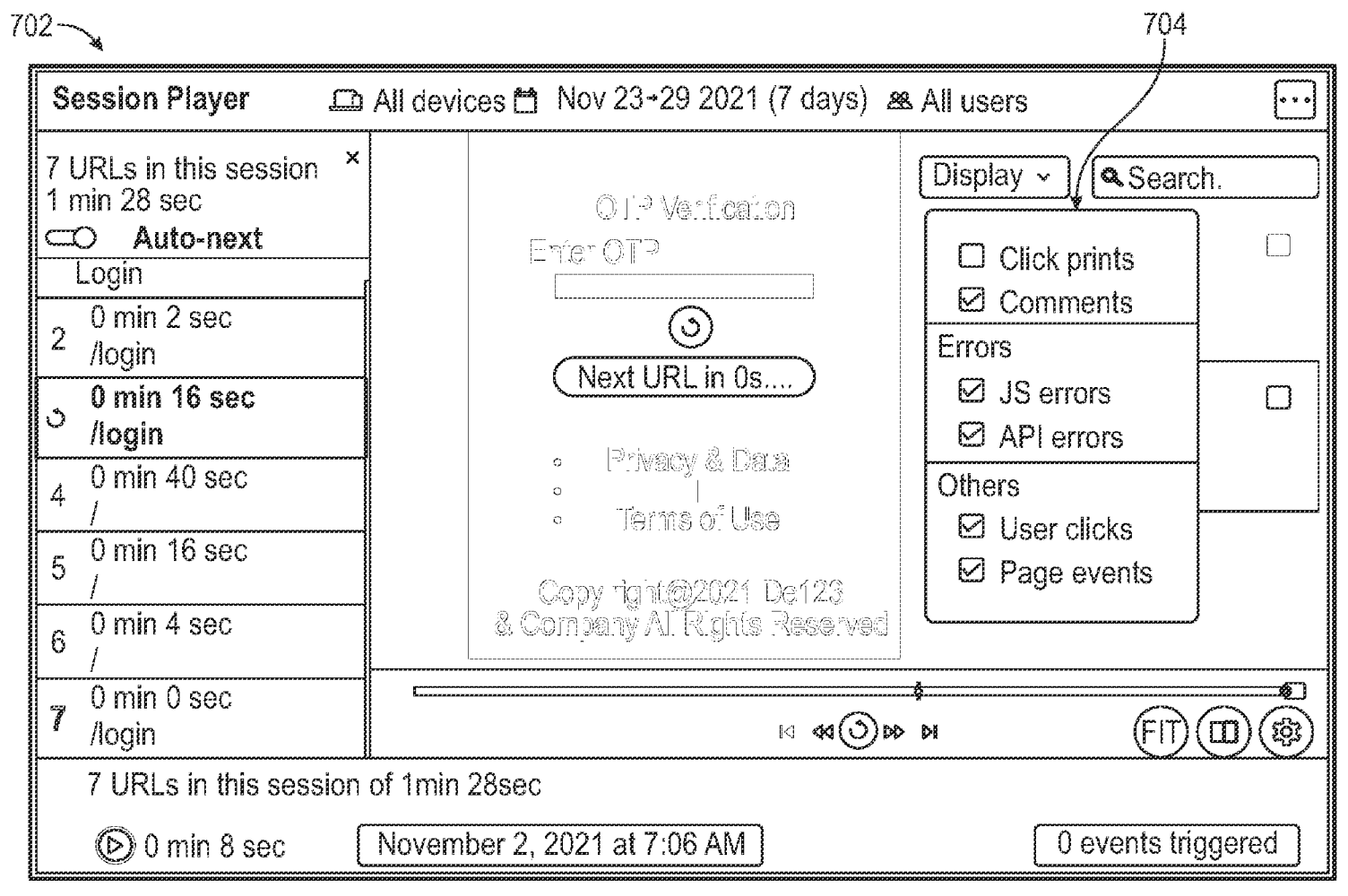

FIG. 7 is an example user interface 702 that facilitates playback of a user session (e.g., event stream) which is provided (e.g., by session replay system 208) for display on a client device (e.g., experience analytics client 104), in accordance with some embodiments of the subject technology.

As illustrated, user interface 702 is similar to user interface 602 discussed above in FIG. 6 and includes an interface area 704 that provides a dropdown menu including a set of selectable graphical elements to determine which events to display during session playback of the event stream. In the example of FIG. 7, interface area 704 includes selectable graphical elements for click prints, comments, JavaScript errors, API errors, user clicks, and page events. It is appreciated that interface area 704 can provide other selectable graphical elements corresponding to other events for selection and display during session playback. Upon selection, the session replay system 208 can populate the corresponding events for display during the session replay and for inclusion as graphical elements on the playback timeline.

Figure 8:
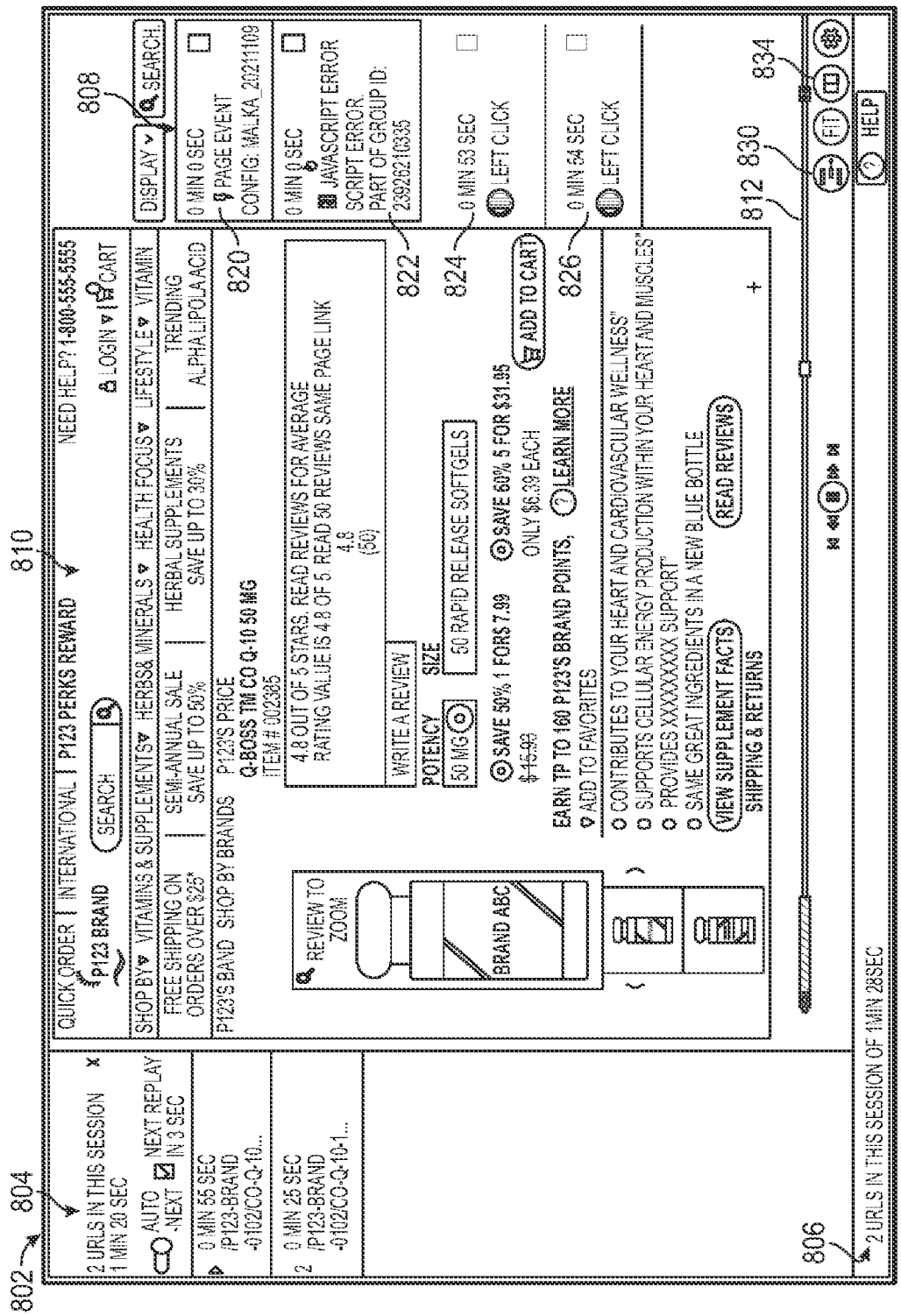
FIG. 8 illustrates an example user interface in accordance with one embodiment.

FIG. 8 is an example user interface 802 that facilitates playback of a user session (e.g., event stream) which is provided (e.g., by session replay system 208) for display on a client device (e.g., experience analytics client 104), in accordance with some embodiments of the subject technology.

As illustrated, user interface 802 includes interface area 804 that includes a set of URLs from the event stream which can be presented in chronological order (or any other type of order) as each URL was accessed or viewed by the user (e.g., the user associated with the user session) during the session replay. As further shown, interface area 810 represents a viewport of the user's session and in this example shows a particular web page from a retail web site. In this example, interface area 810 is positioned in the center of user interface 802, adjacent to interface area 804 to the left, and adjacent to interface area 808 to the right.

As further illustrated, interface area 808 includes a set of events corresponding to events such as user activity including user clicks, comments, JavaScript errors, API errors, user clicks, and page events, and the like. In this example, interface area 808 includes a graphical item 820, graphical item 822, graphical item 824, and graphical item 826 where each corresponds to and represents a particular event occurring in the session. Each of the aforementioned graphical items in interface area 808 are selectable by the viewing user of the session replay.

User interface 802 also includes interface area 806 that displays a list of URLs (not shown) that are included in the session playback. In an example, interface area 806 may also include additional URLs that are not included in the session playback but are associated with different event streams and match a same set of conditions.

As also shown, interface area 812 includes a selectable representation of a timeline corresponding to the session playback which can include graphical indicators of the events shown in interface area 808. In an implementation, when a graphical item, corresponding to a particular event, is selected from interface area 808, playback of the session can move to corresponding position on the timeline based on a timestamp of the particular event. In an implementation, user activity during the session playback can be indicated in interface area 812 as respective graphical items (e.g., rectangular blocks larger in height than the timeline in which events can be indicated as smaller circular shapes within such a rectangular block). Additionally, interface area 812 also includes a set of playback controls (e.g., play, pause, fast forward, fast reverse, skip forward, skip backward, and the like).

In the example of FIG. 8, user interface 802 (deleted) includes graphical item 830 and graphical item 834 (e.g., selectable buttons). Graphical item 830 indicates that playback of the session is currently in a fixed playback mode where graphical items corresponding to respective events are displayed in interface area 808 and not overlaid in the viewport area of the session shown in interface area 810. Graphical item 834, upon being first selected, corresponds to a function that activates the display of interface area 808 in user interface 802, or upon being selected again, corresponds to a function that hides the display of the interface area 808 in user interface 802.

Figure 9:
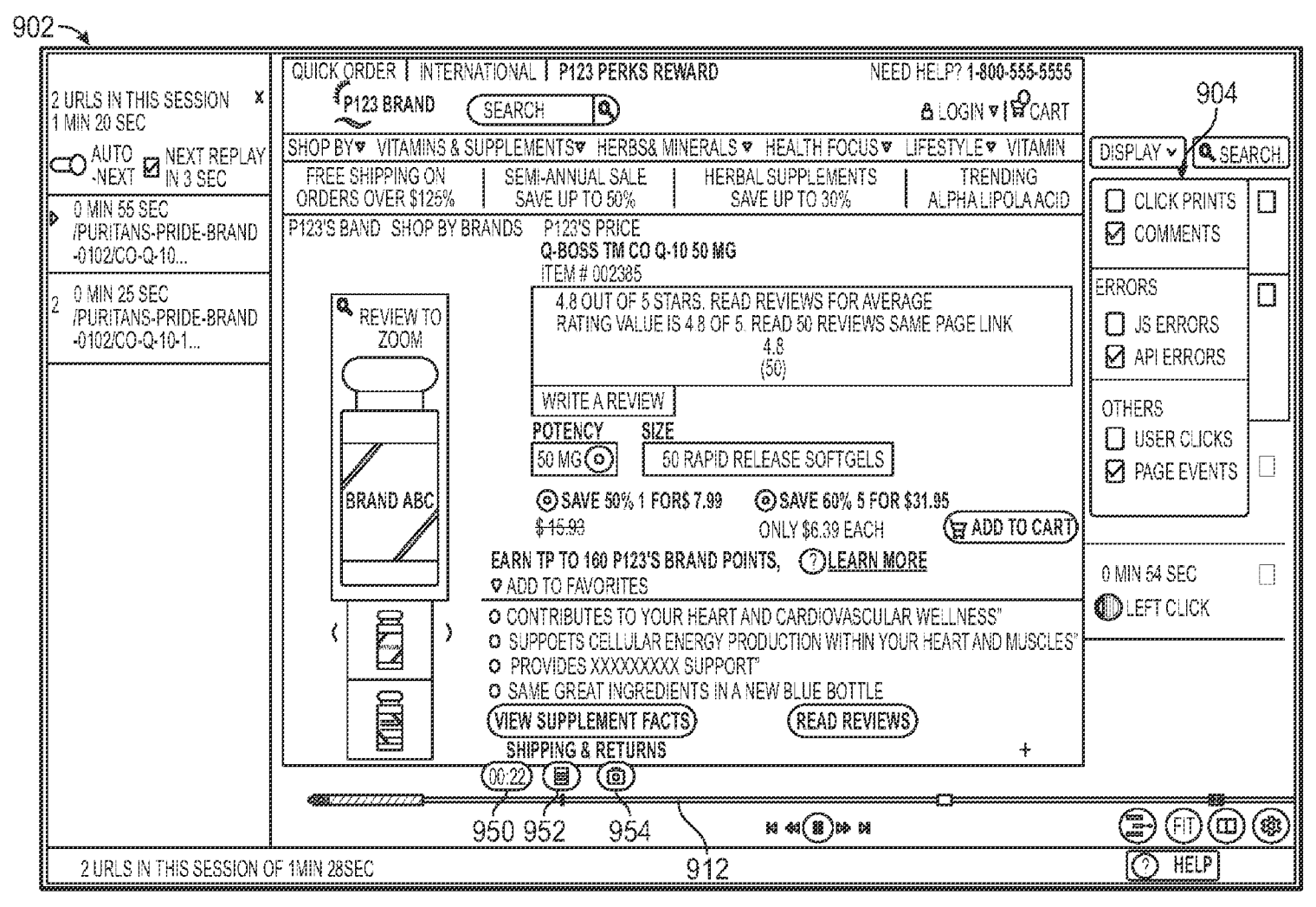

FIG. 9 is an example user interface 902 that facilitates playback of a user session (e.g., event stream) which is provided (e.g., by session replay system 208) for display on a client device (e.g., experience analytics client 104), in accordance with some embodiments of the subject technology.

As illustrated, user interface 902 includes interface area 904. In this example, user interface 902 is similar to user interface 802 discussed above in FIG. 8 and includes an interface area 904 that provides a dropdown menu including a set of selectable graphical elements to determine which events to display during session playback of the event stream. In the example of FIG. 9, interface area 904 includes selectable graphical elements for click prints, comments, JavaScript errors, API errors, user clicks, and page events. It is appreciated that interface area 904 can provide other selectable graphical elements corresponding to other events for selection and display during session playback. Upon selection, the session replay system 208 can populate the corresponding events for display during the session replay and for inclusion as graphical elements on the playback timeline.

As further shown, interface area 912 includes a selectable representation of a timeline corresponding to the session playback which can include graphical indicators of the events selected in interface area 904. In an implementation, when a graphical item, corresponding to a particular event, is selected from interface area 904, playback of the session can move to corresponding position on the timeline based on a timestamp of the particular event. In an implementation, user activity during the session playback can be indicated in interface area 912 as respective graphical items (e.g., rectangular blocks larger in height than the timeline in which events can be indicated as smaller circular shapes within such a rectangular block). Additionally, interface area 912 also includes a set of playback controls (e.g., play, pause, fast forward, fast reverse, skip forward, skip backward, and the like).

In the example of FIG. 9, above interface area 912, graphical item 950, graphical item 952, and graphical item 954 are shown. Graphical item 950 indicates a particular timestamp of a particular event that is at a current playback position on the timeline. Graphical item 952 is a selectable graphical item, which when selected, can cause a separate (not shown) interface to be displayed that enables the viewing user of the session playback to enter in a comment or note for the event at the current playback position (e.g., indicated by graphical item 950). Moreover, graphical item 954, when selected, can initiate an operation to perform a screenshot operation on the viewport of the session playback in user interface 902.

Figure 10:
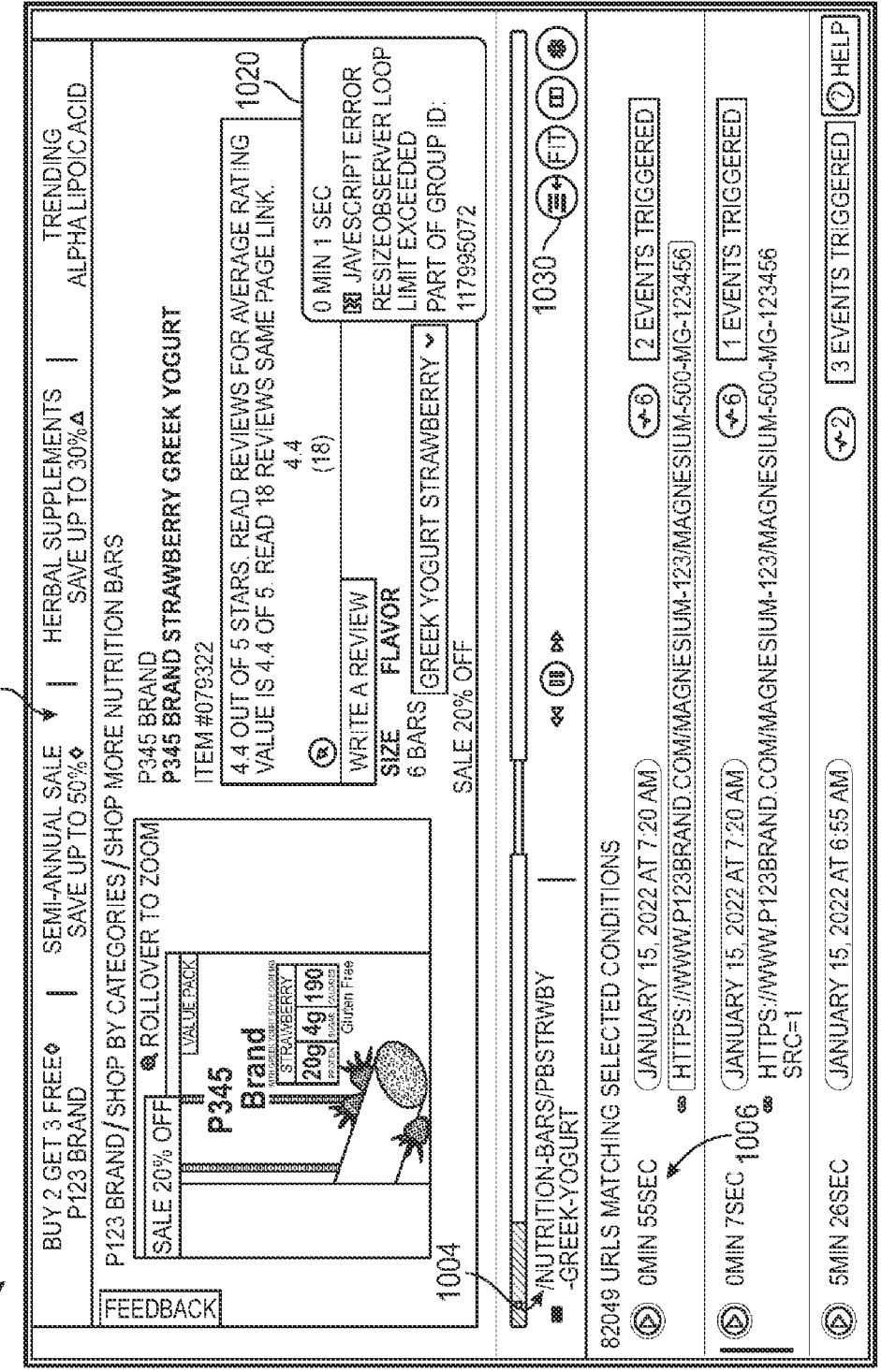
FIG. 10 illustrates an example user interface in accordance with one embodiment.

FIG. 10 is an example user interface 1002 that facilitates playback of a user session (e.g., event stream) which is provided (e.g., by session replay system 208) for display on a client device (e.g., experience analytics client 104), in accordance with some embodiments of the subject technology.

In the example of FIG. 10, user interface 1002 is shown in floating mode in which a graphical item representing an event is displayed as an overlay over the viewport of a session playback corresponding to interface area 1010.

As shown, interface area 1004 includes a URL from the event stream that was accessed or viewed by the user (e.g., the user associated with the user session) during the session replay. In this example, interface area 1004 has a height (e.g., in pixels) where there is only room for a single URL to be displayed in interface area 1004.

As mentioned above, user interface 1002 is in a floating mode, which can be activated by a selection of graphical item 1030 that is positioned below the playback timeline. In this example, as an event occurs (e.g., JavaScript error) during the session playback, a graphical item 1020 is displayed as an overlay over the viewport of the session playback shown in interface area 1010. In this example, graphical item 1020 corresponds to the event that has occurred during session playback, and includes information about the event such as a timestamp of when the event occurred, a type of event, and an identifier (e.g., group ID) associated with the event. It is appreciated that other types of information can be provided by graphical item 1020. For example, information related to a comment that was provided for the event can included for display in graphical item 1020 in some examples.

In an implementation, as mentioned before, user activity during the session playback can be indicated along the timeline as respective graphical items (e.g., rectangular blocks larger in height than the timeline in which events can be indicated as smaller circular shapes within such a rectangular block).

As further shown, interface area 1006 includes a listing of URLs that match a specified set of conditions. In an implementation, session replay system 208 can populate interface area 1006 based on a set of conditions including, for example, a number of users (e.g., all users, users that match another type of criteria, and the like), and users who visited any page and encountered a particular type of error (e.g., JavaScript error of a particular type). In an example, such a listing of URLs are not included in the session playback but are associated with different event streams (e.g., corresponding to different user sessions from the session currently being played back as part of the event stream in the viewport) and match a same set of conditions.

Figure 11:
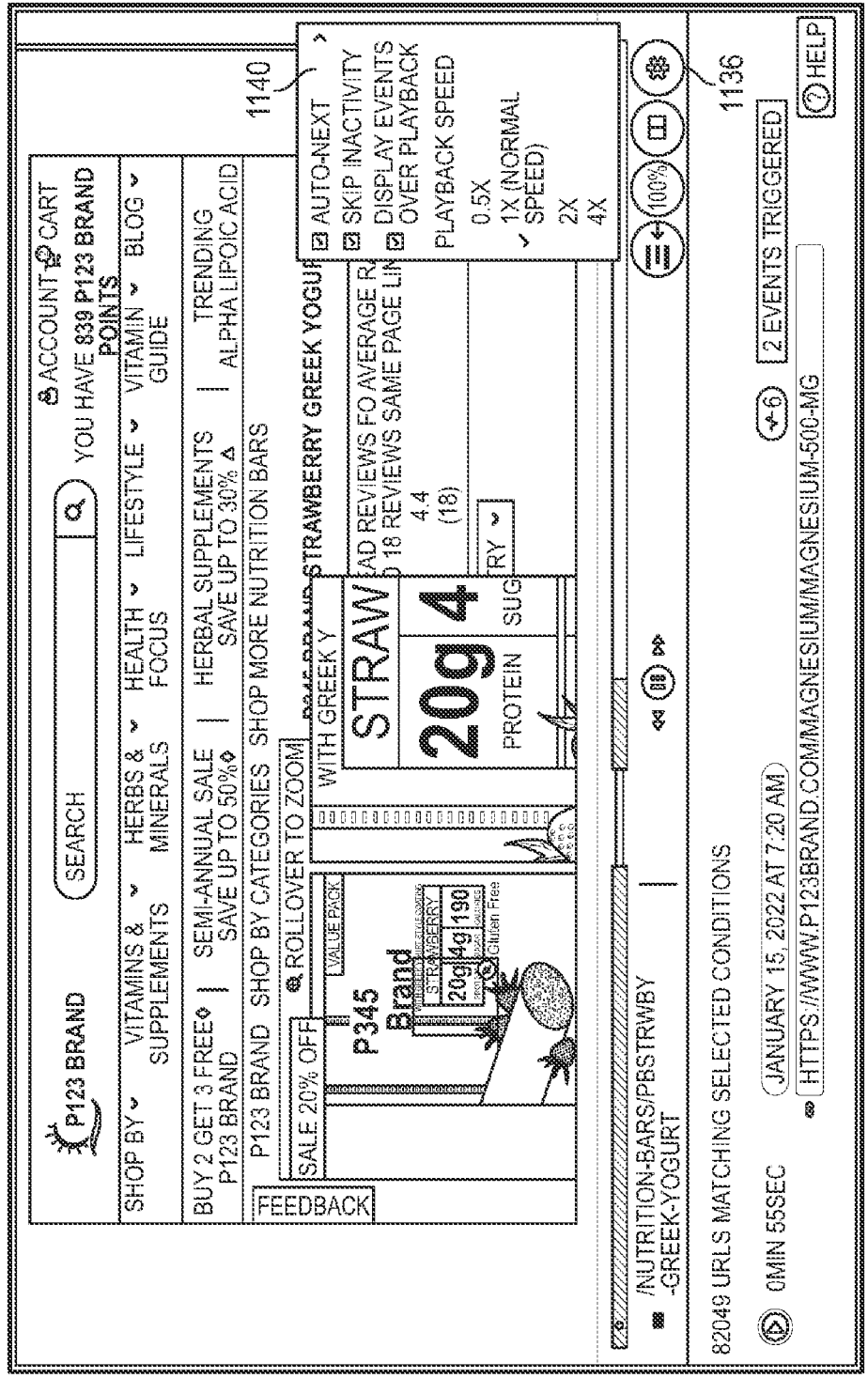
FIG. 11 illustrates an example user interface in accordance with one embodiment.

FIG. 11 is an example user interface 1102 that facilitates playback of a user session (e.g., event stream) which is provided (e.g., by session replay system 208) for display on a client device (e.g., experience analytics client 104), in accordance with some embodiments of the subject technology.

In this example, user interface 1102 is similar to user interface 1002 described above in FIG. 10. User interface 1102 includes graphical item 1136 which when selected causes graphical item 1140 to be displayed. Graphical item 1140 is overlaid over the viewport of the session playback (e.g., overlaid in a manner where part of the user interface 1102 may be obscured or covered) includes different options for controlling and affecting session playback including, for example, playback speed (e.g., 0.5×, 1×, 2×, and 4×), auto-next, skip inactivity, and display events over playback.

Figure 12:
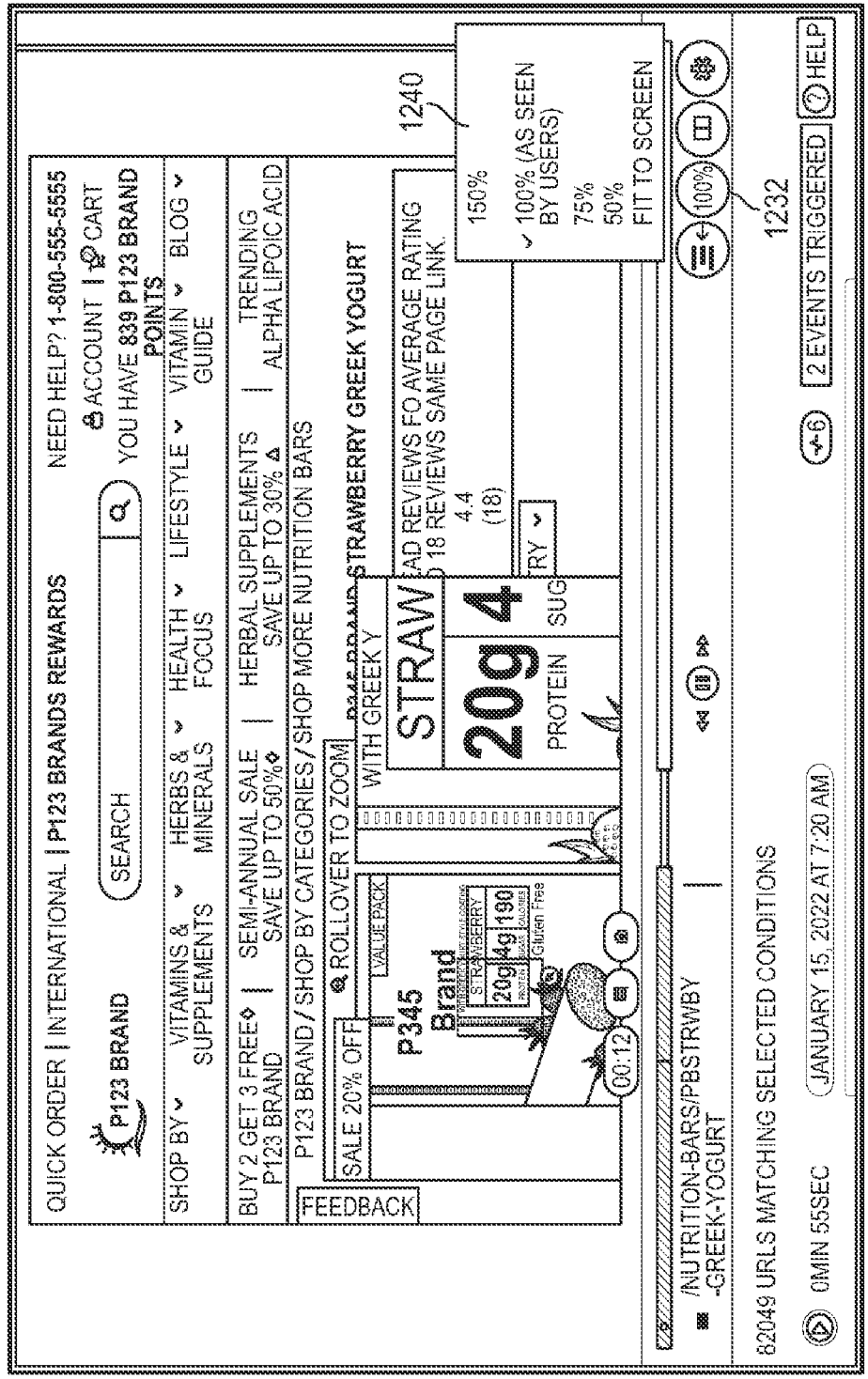
FIG. 12 illustrates an example user interface in accordance with one embodiment.

FIG. 12 is an example user interface 1202 that facilitates playback of a user session (e.g., event stream) which is provided (e.g., by session replay system 208) for display on a client device (e.g., experience analytics client 104), in accordance with some embodiments of the subject technology.

In this example, user interface 1202 is similar to user interface 1102 described above in FIG. 11. User interface 1202 includes graphical item 1232 which when selected causes graphical item 1240 to be displayed. Graphical item 1240 is overlaid over the viewport of the session playback (e.g., overlaid in a manner where part of the user interface 120202 may be obscured or covered) includes different options for a display scale (e.g., how zoomed in or zoomed out the viewport and graphical items therein will be displayed during session playback) of the viewport of session playback including, for example, 150%, 100%, 75%, 50%, and fit to screen.

Machine Architecture

Figure 13:
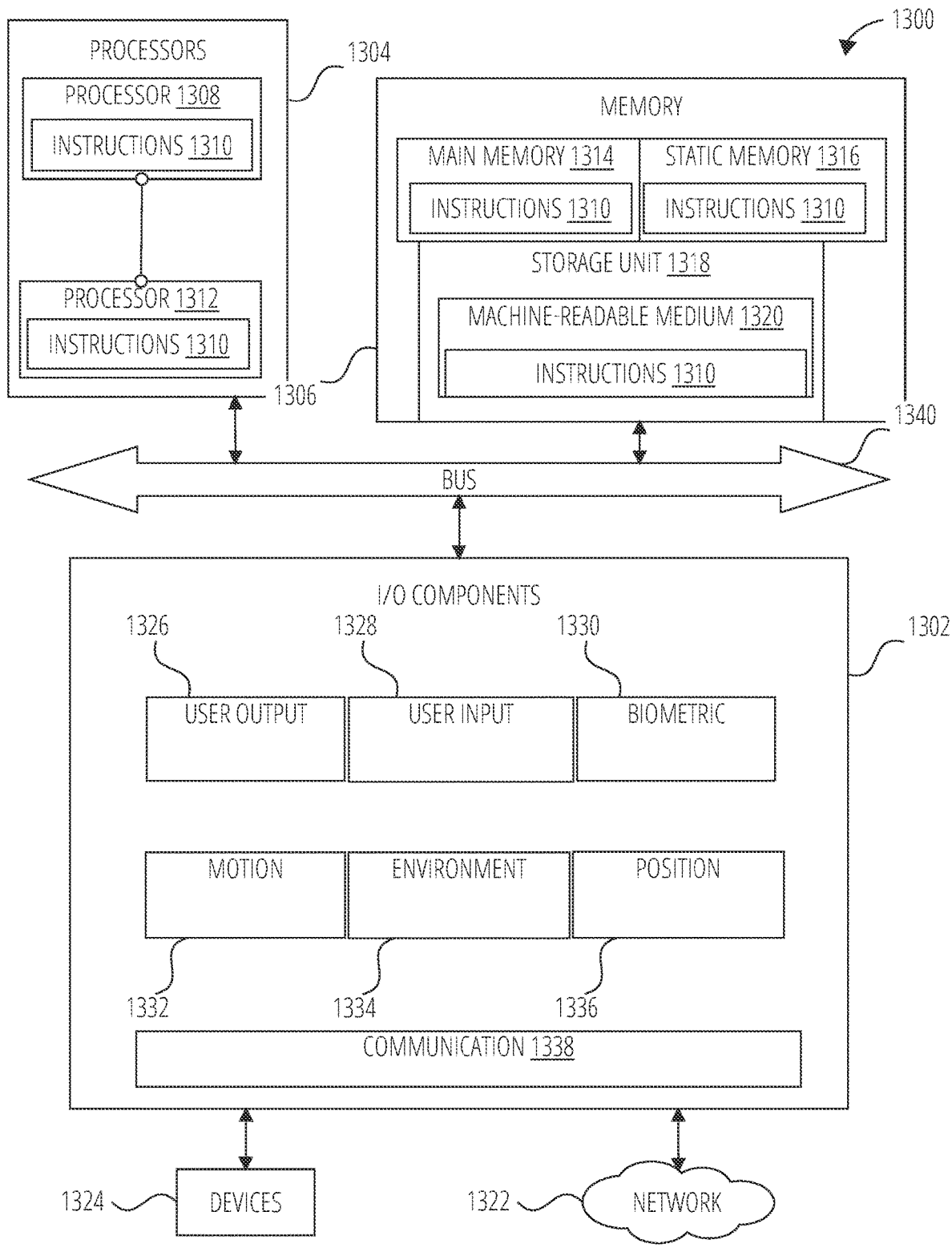
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an application, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein. The machine 1300, for example, may comprise the member client device 102 or any one of a number of server devices forming part of the experience analytics server 116. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1302, which may be configured to communicate with each other via a bus 1340. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1306, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within at least one of the processors 1304 (e.g., within the processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1326 and user input components 1328. The user output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1332 include acceleration sensor components (e.g., accelerometer), gravitation sensor components, rotation sensor components (e.g., gyroscope).

The environmental components 1334 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1336 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface component or another suitable device to interface with the network 1322. In further examples, the communication components 1338 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi® signal triangulation, location via detecting an NFC beacon signal that may indicate a particular location, and so forth.

The various memories (e.g., main memory 1314, static memory 1316, and memory of the processors 1304) and storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

Software Architecture

Figure 14:
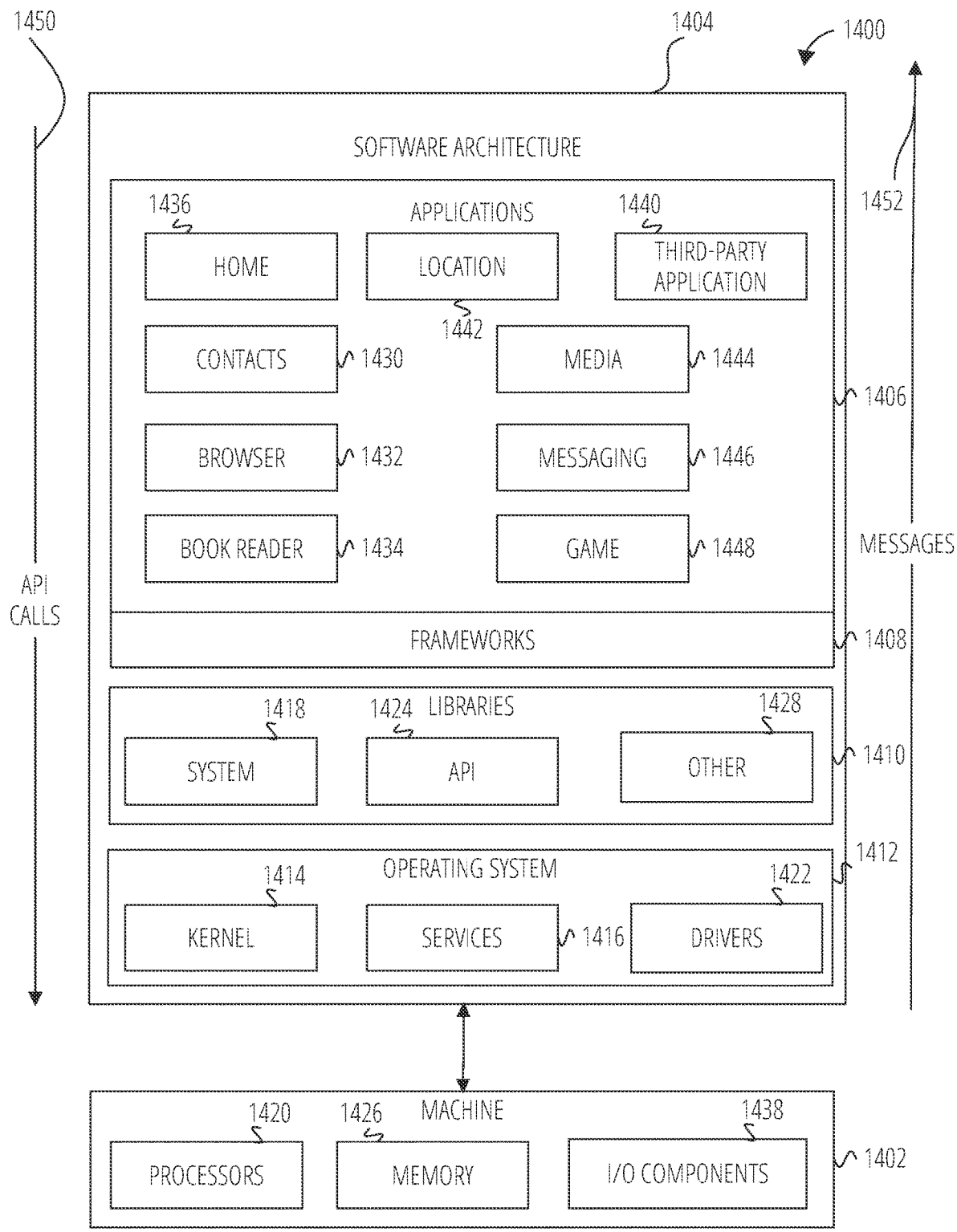
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    detecting user activity on a web site, the user activity corresponding to a user session on the web site associated with a first client device of a visiting user;
    selecting a recording process for the user activity based at least in part on a set of recording parameters, the set of recording parameters being configured prior to detecting the user activity;

performing the recording process to generate an event stream based at least in part on the set of recording parameters;
storing the event stream after the user session has ended; and
providing the event stream for viewing the user session on a second client device, the second client device being different from the first client device, the providing comprising:
generating a user interface for display on the second client device, the user interface comprising a first graphical item corresponding to a timeline, a second graphical item indicating a timestamp of a particular event at a particular playback position on the timeline, a third graphical item for entering in a comment for the particular event at the particular playback position on the timeline, and a fourth graphical item to perform a screenshot operation on a viewport of viewing the user session on the second client device,
the second graphical item, the third graphical item, and the fourth graphical item being positioned above the particular playback position on the timeline,
the second graphical item, the third graphical item, and the fourth graphical item being positioned in a horizontal arrangement with each other, and
the second graphical item, the third graphical item, and the fourth graphical item being in parallel with respect to the timeline of the first graphical item;
receiving a selection of a particular graphical item, the particular graphical item being positioned below the timeline;
in response to receiving the selection of the particular graphical item, activating a floating mode for the user interface; and
during playback of the user session, providing a second particular graphical item as an overlay over the viewport of the playback of the user session, the second particular graphical item including a display of information corresponding to a particular event that has occurred during the playback of the user session, the information comprising a timestamp of when the particular event occurred, a type of event, and an identifier associated with the particular event.

2. The method of claim 1, wherein the set of recording parameters comprises a sampling rate and further comprising:
generating a first random number based on a random number generator algorithm;
selecting the user session for the recording process based on determining that the first random number is within a threshold of a second random number, the second random number being generated after the first random number or after detecting the user activity on the web site; and
initiating the recording process for the user session based at least in part on determining that recording the user session is within the sampling rate based on a number of previously recorded sessions within a period of time or number of stored event streams within the period of time.

3. The method of claim 1, wherein the set of recording parameters comprises a sampling rate based on a set of uniform resource locator (URLs) and further comprising:
determining, based on the user activity on the web site, that a particular URL from the set of URLs has been accessed; and
initiating the recording process for the user session based at least in part on determining that recording the user session is within the sampling rate based on a number of previously recorded sessions within a period of time or number of stored event streams within the period of time.

4. The method of claim 1, wherein the set of recording parameters comprises a set of events, the set of events comprises a first event corresponding to receiving a comment from a customer on the web site, and a second event corresponding to an API error, and further comprising:
initiating the recording process for the user session in response to determining that a particular event was detected during the user session.

5. The method of claim 1, wherein the set of recording parameters comprises a set of events that occur on a set of uniform resource locator (URLs) and further comprising:
initiating the recording process for the user session in response to determining that a particular event from the set of events was detected on a particular URL from the set of URLs during the user session.

6. The method of claim 1, wherein the identifier comprises a group identifier, and further comprising:
receiving the event stream corresponding to the user session;
determining a set of URLs from the event stream;
determining a set of events that were recorded in the event stream;
generating the user interface based on the set of URLs and the set of events; and
providing the user interface for display on the second client device.

7. The method of claim 6, wherein receiving the event stream comprises:
searching a session table for the event stream corresponding to the user session based on a set of search parameters, the set of search parameters comprising a set of conditions, the set of conditions comprising an event type, an event identifier, an error type, a number of users, an error identifier, a user identifier, a URL identifier, or a session identifier; and
retrieving the event stream from the session table based on matching the event stream to the set of search parameters.

8. The method of claim 7, wherein the set of events comprises at least one of a user click, a comment, a particular JavaScript error, an API error, or a page event.

9. The method of claim 6, wherein generating the user interface based on the set of URLs and the set of events comprises:
determining that a fixed mode for playback of the event stream has been activated for the user interface;
providing for display a first interface area, the first interface area including a viewport for playback of the event stream, the first interface area displaying a set of frames from the event stream, each frame from the set of frames including a representation of a first set of graphical items from a particular URL of the web site;
providing for display a second interface area adjacent to the first interface area, the second interface area comprising a second set of selectable graphical items corresponding to the set of URLs from the event stream; and
providing for display a third interface area adjacent to the first interface area and not adjacent to the second interface area, the third interface area comprising a third set of selectable graphical items corresponding to the set of events that were recorded in the event stream, wherein the first interface area includes a representation of a particular event from the third interface area that occurred within one URL from the set of URLs from the second interface area.

10. The method of claim 6, wherein generating the user interface based on the set of URLs and the set of events comprises:
providing for display a first interface area, the first interface area including the viewport for playback of the event stream, the first interface area displaying a set of frames from the event stream, each frame from the set of frames including a representation of a first set of graphical items from a particular URL of the web site;
providing for display a second graphical item that is overlaid on only a portion of the first interface area corresponding to the viewport for playback of the event stream, the second graphical item comprising information corresponding to a particular JavaScript error; and
providing for display a third interface area adjacent to the first interface area, the third interface area including a set of particular graphical items corresponding to a set of URLs that match a set of conditions, the set of URLs including at least one URL associated with a different user session than the user session.

11. A system comprising:
a processor; and
a memory storing instructions that, when executed by the processor, configure the system to perform operations comprising:
detecting user activity on a web site, the user activity corresponding to a user session on the web site associated with a first client device of a visiting user;
selecting a recording process for the user activity based at least in part on a set of recording parameters, the set of recording parameters being configured prior to detecting the user activity;
performing the recording process to generate an event stream based at least in part on the set of recording parameters;
storing the event stream after the user session has ended; and
providing the event stream for viewing the user session on a second client device, the second client device being different from the first client device, the providing comprising:
generating a user interface for display on the second client device, the user interface comprising a first graphical item corresponding to a timeline, a second graphical item indicating a timestamp of a particular event at a particular playback position on the timeline, a third graphical item for entering in a comment for the particular event at the particular playback position on the timeline, and a fourth graphical item to perform a screenshot operation on a viewport of viewing the user session on the second client device,
the second graphical item, the third graphical item, and the fourth graphical item being positioned above the particular playback position on the timeline,
the second graphical item, the third graphical item, and the fourth graphical item being positioned in a horizontal arrangement with each other, and
the second graphical item, the third graphical item, and the fourth graphical item being in parallel with respect to the timeline of the first graphical item;
receiving a selection of a particular graphical item, the particular graphical item being positioned below the timeline;
in response to receiving the selection of the particular graphical item, activating a floating mode for the user interface; and
during playback of the user session, providing a second particular graphical item as an overlay over the viewport of the playback of the user session, the second particular graphical item including a display of information corresponding to a particular event that has occurred during the playback of the user session, the information comprising a timestamp of when the particular event occurred, a type of event, and an identifier associated with the particular event.

12. The system of claim 11, wherein the set of recording parameters comprises a sampling rate and wherein the operations further comprise:
generating a first random number based on a random number generator algorithm;
selecting the user session for the recording process based on determining that the first random number is within a threshold of a second random number, the second random number being generated after the first random number or after detecting the user activity on the web site; and
initiating the recording process for the user session based at least in part on determining that recording the user session is within the sampling rate based on a number of previously recorded sessions within a period of time or number of stored event streams within the period of time.

13. The system of claim 11, wherein the set of recording parameters comprises a sampling rate based on a set of uniform resource locator (URLs) and wherein the operations further comprise:
determining, based on the user activity on the web site, that a particular URL from the set of URLs has been accessed; and
initiating the recording process for the user session based at least in part on determining that recording the user session is within the sampling rate based on a number of previously recorded sessions within a period of time or number of stored event streams within the period of time.

14. The system of claim 11, wherein the set of recording parameters comprises a set of events, the set of events comprises a first event corresponding to receiving a comment from a customer on the web site, and a second event corresponding to an API error, and wherein the operations further comprise:
initiating the recording process for the user session in response to determining that a particular event was detected during the user session.

15. The system of claim 11, wherein the set of recording parameters comprises a set of events that occur on a set of uniform resource locator (URLs) and wherein the operations further comprise:
initiating the recording process for the user session in response to determining that a particular event from the set of events was detected on a particular URL from the set of URLs during the user session.

16. The system of claim 11, wherein the operations further comprise:
receiving the event stream corresponding to the user session;
determining a set of URLs from the event stream;

determining a set of events that were recorded in the event stream;

generating the user interface based on the set of URLs and the set of events; and providing the user interface for display on the second client device.

17. The system of claim 16, wherein receiving the event stream comprises:

searching a session table for the event stream corresponding to the user session based on a set of search parameters, the set of search parameters comprising a set of conditions, the set of conditions comprising an event type, an event identifier, an error type, a number of users, an error identifier, a user identifier, a URL identifier, or a session identifier; and retrieving the event stream from the session table based on matching the event stream to the set of search parameters.

18. The system of claim 17, wherein the set of events comprises at least one of a user click, a comment, a particular JavaScript error, an API error, or a page event.

19. The system of claim 16, wherein generating the user interface based on the set of URLs and the set of events comprises:

determining that a fixed mode for playback of the event stream has been activated for the user interface;

providing for display a first interface area, the first interface area including a viewport for playback of the event stream, the first interface area displaying a set of frames from the event stream, each frame from the set of frames including a representation of a first set of graphical items from a particular URL of the web site;

providing for display a second interface area adjacent to the first interface area, the second interface area comprising a second set of selectable graphical items corresponding to the set of URLs from the event stream; and providing for display a third interface area adjacent to the first interface area and not adjacent to the second interface area, the third interface area comprising a third set of selectable graphical items corresponding to the set of events that were recorded in the event stream, wherein the first interface area includes a representation of a particular event from the third interface area that occurred within one URL from the set of URLs from the second interface area.

20. The system of claim 16, wherein generating the user interface based on the set of URLs and the set of events comprises:

providing for display a first interface area, the first interface area including the viewport for playback of the event stream, the first interface area displaying a set of frames from the event stream, each frame from the set of frames including a representation of a first set of graphical items from a particular URL of the web site;

providing for display a second graphical item that is overlaid on only a portion of the first interface area, the second graphical item corresponding to a particular event associated with the event stream; and providing for display a third interface area adjacent to the first interface area, the third interface area including a set of particular graphical items corresponding to a set of URLs that match a set of conditions, the set of URLs including at least one URL associated with a different user session than the user session.

21. A non-transitory computer-readable storage medium, 4 including instructions that when executed by a computer, cause the computer to perform operations comprising:

detecting user activity on a web site, the user activity corresponding to a user session on the web site associated with a first client device of a visiting user;

selecting a recording process for the user activity based at least in part on a set of recording parameters, the set of recording parameters being configured prior to detecting the user activity;

performing the recording process to generate an event stream based at least in part on the set of recording parameters;

storing the event stream after the user session has ended; and providing the event stream for viewing the user session on a second client device, the second client device being different from the first client device, the providing comprising:

generating a user interface for display on the second client device, the user interface comprising a first graphical item corresponding to a timeline, a second graphical item indicating a timestamp of a particular event at a particular playback position on the timeline, a third graphical item for entering in a comment for the particular event at the particular playback position on the timeline, and a fourth graphical item to perform a screenshot operation on a viewport of viewing the user session on the second client device, the second graphical item, the third graphical item being, and the fourth graphical item positioned above the particular playback position on the timeline, the second graphical item, the third graphical item, and the fourth graphical item being positioned in a horizontal arrangement with each other, and the second graphical item, the third graphical item, and the fourth graphical item being in parallel with respect to the timeline of the first graphical item;

receiving a selection of a particular graphical item, the particular graphical item being positioned below the timeline;

in response to receiving the selection of the particular graphical item, activating a floating mode for the user interface; and during playback of the user session, providing a second particular graphical item as an overlay over the viewport of the playback of the user session, the second particular graphical item including a display of information corresponding to a particular event that has occurred during the playback of the user session, the information comprising a timestamp of when the particular event occurred, a type of event, and an identifier associated with the particular event.

22. The computer-readable storage medium of claim 21, wherein the set of recording parameters comprises a sampling rate and wherein the operations further comprise:

generating a first random number based on a random number generator algorithm;

selecting the user session for the recording process based on determining that the first random number is within a threshold of a second random number, the second random number being generated after the first random number or after detecting the user activity on the web site; and initiating the recording process for the user session based at least in part on determining that recording the user session is within the sampling rate based on a number of previously recorded sessions within a period of time or number of stored event streams within the period of time.

23. The computer-readable storage medium of claim 21, wherein the set of recording parameters comprises a sampling rate based on a set of uniform resource locator (URLs) and wherein the operations further comprise:
   determining, based on the user activity on the web site, that a particular URL from the set of URLs has been accessed; and
   initiating the recording process for the user session based at least in part on determining that recording the user session is within the sampling rate based on a number of previously recorded sessions within a period of time or number of stored event streams within the period of time.

24. The computer-readable storage medium of claim 21, wherein the set of recording parameters comprises a set of events, the set of events comprises a first event corresponding to receiving a comment from a customer on the web site, and a second event corresponding to an API error, and wherein the operations further comprise:
   initiating the recording process for the user session in response to determining that a particular event was detected during the user session.

25. The computer-readable storage medium of claim 21, wherein the set of recording parameters comprises a set of events that occur on a set of uniform resource locator (URLs) and wherein the operations further comprise:
   initiating the recording process for the user session in response to determining that a particular event from the set of events was detected on a particular URL from the set of URLs during the user session.

26. The computer-readable storage medium of claim 21, wherein the operations further comprise:
   receiving the event stream corresponding to the user session;
   determining a set of URLs from the event stream;
   determining a set of events that were recorded in the event stream;
   generating the user interface based on the set of URLs and the set of events; and
   providing the user interface for display on the second client device.

27. The computer-readable storage medium of claim 26, wherein receiving the event stream comprises:
   searching a session table for the event stream corresponding to the user session based on a set of search parameters, the set of search parameters comprising a set of conditions, the set of conditions comprising an event type, an event identifier, an error type, a number of users, an error identifier, a user identifier, a URL identifier, or a session identifier; and
   retrieving the event stream from the session table based on matching the event stream to the set of search parameters.

28. The computer-readable storage medium of claim 27, wherein the set of events comprises at least one of a user click, a comment, a particular JavaScript error, an API error, or a page event.

29. The computer-readable storage medium of claim 26, wherein generating the user interface based on the set of URLs and the set of events comprises:
   determining that a fixed mode for playback of the event stream has been activated for the user interface;
   providing for display a first interface area, the first interface area including a viewport for playback of the event stream, the first interface area displaying a set of frames from the event stream, each frame from the set of frames including a representation of a first set of graphical items from a particular URL of the web site;
   providing for display a second interface area adjacent to the first interface area, the second interface area comprising a second set of selectable graphical items corresponding to the set of URLs from the event stream;
   providing for display a third interface area adjacent to the first interface area and not adjacent to the second interface area, the third interface area comprising a third set of selectable graphical items corresponding to the set of events that were recorded in the event stream, wherein the first interface area includes a representation of a particular event from the third interface area that occurred within one URL from the set of URLs from the second interface area; and
   providing for display a fourth interface area, the fourth interface area comprising a fourth set of graphical items including a first graphical item corresponding to a timeline, a second graphical item corresponding to a representation of the particular event from the third interface area, and a third graphical item corresponding to a representation of the user activity that occurred within the one URL from the set of URLs from the second interface area.

30. The computer-readable storage medium of claim 26, wherein generating the user interface based on the set of URLs and the set of events comprises:
   providing for display a first interface area, the first interface area including the viewport for playback of the event stream, the first interface area displaying a set of frames from the event stream, each frame from the set of frames including a representation of a first set of graphical items from a particular URL of the web site;
   providing for display a second graphical item that is overlaid on only a portion of the first interface area, the second graphical item corresponding to a particular event associated with the event stream;
   providing for display a third interface area adjacent to the first interface area, the third interface area including a set of particular graphical items corresponding to a set of URLs that match a set of conditions, the set of URLs including at least one URL associated with a different user session than the user session; and
   providing for display a fourth interface area, the fourth interface area comprising a fourth set of graphical items including a first graphical item corresponding to a timeline, a second graphical item corresponding to a representation of the particular event from the second graphical item, and a third graphical item corresponding to a representation of the user activity that occurred within the one URL from the set of URLs from the event stream.

* * * * *

UNITED STATES PATENT AND TRADEMARK OFFICE
CERTIFICATE OF CORRECTION

| | | |
|---|---|---|
| PATENT NO. | : 12,363,200 B2 | |
| APPLICATION NO. | : 17/731747 | |
| DATED | : July 15, 2025 | |
| INVENTOR(S) | : Goh et al. | |

It is certified that error appears in the above-identified patent and that said Letters Patent is hereby corrected as shown below:

In the Specification

In Column 17, Line 19, delete "120202" and insert --1202-- therefor

In Column 17, Line 67, delete "I/O" and insert --(I/O)-- therefor

In Column 18, Line 22, delete "1306," and insert --1314,-- therefor

In the Claims

In Column 30, Line 2, in Claim 21, delete "4" and insert --the computer-readable storage medium-- therefor Signed and Sealed this
Fourth Day of November, 2025

John A. Squires
*Director of the United States Patent and Trademark Office*